Figure 1:
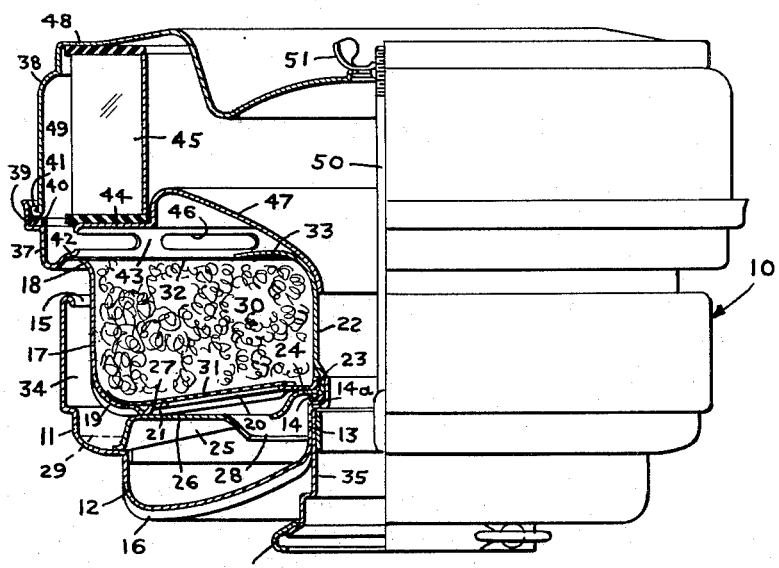

Aug. 2, 1960    D. J. COOK ET AL    2,947,381
AIR CLEANER ASSEMBLY
Filed Oct. 14, 1958

DONALD J. COOK
PATRICK J. SCHOEMER
INVENTORS

BY Lawrence J. Winter
atty.

United States Patent Office 2,947,381
Patented Aug. 2, 1960

2,947,381

AIR CLEANER ASSEMBLY

Donald J. Cook, Livonia, and Patrick J. Schoemer, Wayne, Mich., assignors to Purolator Products, Inc., Rahway, N.J., a corporation of Delaware Filed Oct. 14, 1958, Ser. No. 767,206

6 Claims. (Cl. 183—15)

The present invention relates to an air cleaner, and more particularly to such an assembly highly desirable for use in connection with internal combustion engines, although the invention may have other uses also.

In the past, the so-called oil bath type air cleaner for internal combustion engines has been used frequently. In such an air cleaner, the usual procedure is that the incoming air passes through a cleansing liquid such as crankcase oil and has its path of travel abruptly reversed or changed so dirt particles carried by the air stream will be thrown into the cleansing liquid and caught while the air will then pass upwardly through a filter mass, such as steel wool, curled cattletail, or the like. However, it is well known that one undesirable feature in such an air cleaner is the fact that all of the dirt particles may not be carried into the oil, but will by-pass the liquid and be carried through the filter mass to the interior of the internal combustion engine thus causing wear to the engine parts.

A more recent development in the air cleaner field is the so-called dry type air cleaner wherein contaminated air to be introduced into an internal combustion engine passes through an air cleaner such as a paper compound filter which contains no liquid whatsoever. This type of filter is sometimes called a positive type air filter or cleaner, because all of the air that will reach the engine proper must first pass through the filter screen, so to speak. There is no way for the filtered air to travel to the engine in this type filter without passing directly through the filter.

This type of filter has been found to be much more efficient than the liquid bath type air cleaner which possesses the feature of having a high dirt capacity. However, one disadvantage that has been found in the so-called dry type air filter is the fact that although it is efficient, it is sometimes too efficient, in that it catches all the contaminants or dust particles in the air to be supplied to the engine, and therefore clogs very rapidly so that it has to be cleaned or replaced frequently and thus becomes a nuisance from the maintenance standpoint.

An object of the present invention is to provide a novel air cleaner assembly which possesses high dirt capacity and efficiency without having the disadvantages described hereinabove.

Another object of the present invention is to provide an air cleaner assembly utilizing a liquid bath air cleaner which removes a large portion of the dust and dirt particles in the air and thereafter utilizes the dry type air cleaner or non-liquid bath air cleaner which removes the remainder of the dirt particles and possesses a long operational period of use before it needs cleaning.

A further object of the present invention is to provide an air cleaner assembly which can be inexpensively made, is compact, and requires a minimum of space.

A still further object of the present invention is to provide an air cleaner assembly having a non-liquid bath type air cleaner which may be separated from the other portion of the air cleaner assembly for easy cleaning and replacement thereof without disturbing the liquid bath cleaner.

The present invention further provides an air cleaner assembly having a liquid bath type air cleaner which may be easily separated from the dry type cleaner for cleansing thereof.

The present invention also embodies an air cleaner assembly having a dry type air cleaner which may be used in dusty or heavy duty areas where heretofore such a cleaner could not be utilized because of maintenance requirements.

Figure 2:
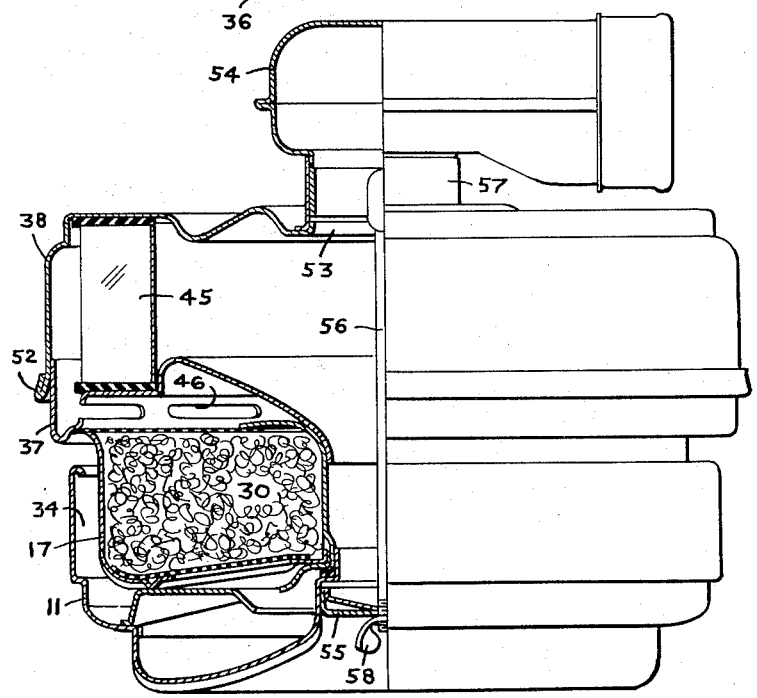

The invention will be better understood when considered in connection with the accompanying drawing forming a part thereof and in which Fig. 1 is a central vertical sectional view through an air cleaner assembly embodying the present invention, and Fig. 2 is a central vertical sectional view through a modified form of the air cleaner assembly of Fig. 1.

Referring to the drawings, the reference numeral 10 designates the air cleaner assembly of the present invention comprising a fabricated lower cup-like casing or shell 11 having a deviated bottom 12 which forms a liquid container for a cleansing liquid such as crankcase oil. The inner portion of the deviated bottom 12 extends vertically upwardly as at 13 to form an inner wall for the cleansing container and is shaped to provide a seat for an annular gasket 14 by an inwardly turned margin 14a. A circular opening 15 is provided in the top of casing 11 while the bottom of the casing is provided with radially extending spaced ribs 16.

Disposed within casing 11 is a filter including a shell having a substantially vertically imperforate wall 17 the upper portion of which is outwardly flared as at 18 to form a seat. The filter shell also includes a bottom 19 integral with the wall 17, which bottom is provided with a plurality of relatively large openings or apertures 20 defined by radially extending ribs 21. The inner wall 22 of the filter shell has the lower end thereof channeled inwardly and rolled outwardly over the upturned marginal portion 23 of a baffle 24 and also rolled over the inner upturned end of the bottom 19. Baffle 24 has the outer rim 25 thereof seated on deviated bottom 12 and is provided with spaced raised channels 27 on which stabilizing feet 27 on the bottom of shell 19 seat while the inner margin thereof is provided with depressed tongues 28, only one of which is shown, to permit liquid from the filter to fall back into the liquid container. The baffle is disposed in the liquid container to meter the amount of liquid carried into the filter mass by travelling air, during operation, the normal liquid level being located as shown by dotted lines 29.

The filter mass or element 30 itself is preferably made of animal hair such as curled cattle's tail or the like. A protective screen 31 is disposed over the openings 20 in the bottom of the shell while the top of the filter mass is also provided with a protective screen 32 and has the inner marginal portion of the screen locked under a flare 33 on the upper end of the inner shell wall 22. The outer wall of casing 11 is spaced from the outer wall of the filter shell 17 so as to provide an annular dirty air inlet 34 therebetween in communication with the liquid container and filter mass. A tubular air outlet conduit 35 in communication with the filter mass is secured inwardly of wall 13 and is provided with an inner marginal channel on which the gasket 14 and channel portion of inner wall 22 may seat. The lower end of conduit 35 is provided with a conventional ring clamp 36 in order to secure the air cleaner assembly to the intake horn of a carburetor, not shown.

The non-liquid bath, or dry type air cleaner comprises cylindrical lower and upper casings 37 and 38 respectively. The upper marginal portion of the lower casing 37 is channeled as indicated at 39 to form a seat for a gasket 40 which extends entirely around the casing. The upper casing is rolled or beaded as at 41 entirely therearound to seat on gasket 40. The bottom of casing 37 is turned inwardly and shaped to seat against rim 18 as indicated at 42, and is thereafter turned upwardly to form a concentric ring 43 and again inwardly as at 44, to form a seat for an annular filter element 45. Filter 45 is made of paper compound material and is convoluted or pleated. The end caps of 45 may be made of plastic material such as Plastisol with the paper pleats thereof being impregnated with phenolic resin. Ring 43 is provided with spaced slots 46 therein in communication with filter mass 30. The bottom of casing 37 inwardly of ring 43 is flared as at 47 and the casing is press-fitted against flared portion of wall 22 when it is seated upon the filter mass 30. The upper casing 38 is provided with a flat marginal rim 48 which seats against the upper end cap of the filter element 45. Filter element 45 has the outer side thereof spaced from upper casing 38 to form an annular air inlet passage 49 therebetween in communication with slots 46.

Upper casing sections 37 and 38 and bottom casing 11 are held together by a bolt 50 secured to conduit 35 by a conventional cross bar and extending through the cover of the upper casing to accommodate a wing nut 51.

In operation, dirty incoming air enters annular air inlet passage 34 through opening 15 and thereafter flows downwardly into contact with liquid in the bottom of the liquid container and then passes upwardly through openings 20 into filter mass 30. In passing through the liquid bath air cleaner, a large portion of the dust and dirt in the air is removed from the air stream by being caught in the cleansing liquid or filter mass. Thereafter, the air flows through slots 46 and ascends through annular passage 49 passing through dry type annular filter 45. In passing through filter 45 any of the dust or dirt particles in the air stream which have not been removed by the liquid bath air filter through which it passed is removed by filter 45. This is because filter 45 is a positive type in that none of the incoming dirty air can by-pass it in its travel through the air cleaner assembly to air outlet 35. The cleaned air then passes through the central portion of the air cleaner assembly and is discharged from the assembly through conduit 35.

It will be noted that the air cleaner assembly of the present invention thus provides a liquid type air cleaner which has a large dirt capacity in series relationship with a positive or dry type air cleaner which will remove any dirt particles not eliminated in the liquid bath air cleaner and which will not clog up readily because the liquid bath cleaner eliminates a large portion of the contaminants before they ever reach the dry type filter. Hence, the present invention provides an air cleaner assembly which has a long life, large capacity, and high efficiency in removing substantially all of the contaminants in a dirty air stream passed therethrough.

When it is desired to clean the dry type air cleaner of the present invention, wing nut 51 is removed so that upper casing 38 may be lifted from the filter element 45 and the filter removed from its seat for cleaning.

In cleaning the liquid bath air cleaner, it is only necessary to remove the lower casing 37 from seat 18, flare 47 being merely press-fitted against filter shell wall 17, and then filter mass 30, its shell, and baffle 24 are merely lifted out of casing 11 as one piece so that casing 11 may be unclamped from the carburetor and the dirty liquid dumped from the liquid container.

The embodiment of the invention shown in Fig. 2 is substantially the same as that shown in Fig. 1 except that the air cleaner assembly is an overhang type air cleaner that is not directly mounted over the carburetor. This is sometimes used in automobiles and is often used in large vehicles such as trucks where the air cleaner assembly is mounted outside of the hood and is provided with a connecting conduit to the carburetor which is located underneath the hood.

In this embodiment of the invention, no seal such as 40 is required between casings 38 and 37, but the lower end of the upper casing is provided with a rolled over bead 52 on the lower edge thereof which is press-fitted over or telescoped on the upper end of lower casing 37. In addition, the clean air outlet 53 is disposed in the top of the assembly in casing 38 the bottom being closed by a cover 55, and communicates with an overhang conduit 54 adapted to be connected to the carburetor off-set from the cleaner assembly. The assembly is held together by bolt 56 secured to a connecting tube 57, joined to upper casing 38 adjacent outlet 53, and extending through the closed bottom of casing 11 to accommodate a wing nut 58.

In operation, dirty air enters annular passage 34 passing down into the liquid container and through the filter mass 30 and slots 46 after which it passes through dry type filter 45 and is discharged therefrom through clean air outlet 53, and conduits 57 and 54 to the carburetor, not shown.

To clean air filter 45 it is merely necessary to lift casing 38 and connecting conduits 57 and 54 from casing 37 after wing nut 58 is first removed. Conduit 54 is connected to a carburetor by clamp means or the like, not forming part of the invention. In cleaning the liquid bath cleaner it is merely necessary to remove the filter mass shell and baffle 24 from casing 11 as in the embodiment of Fig. 1. Casing 11 is supported by means such as straps or the like, not forming part of the invention.

Inasmuch as various changes may be made in the form, location and relative arrangement of the several parts without departing from the essential characteristics of the invention, it will be understood that the invention is not to be limited except by the scope of the appended claims.

What is claimed is:

1. An air cleaner assembly comprising a lower cylindrical casing having a circular opening in the top thereof and a liquid sump therein, an annular filter shell extending through said opening and seated in said casing containing a filter medium therein, said shell having an outer rim portion therearound, an annular air inlet passage provided between said casing and shell, an upper casing comprising upper and lower cylindrical portions, the bottom of said lower cylindrical portion having an annular platform formed thereon and spaced openings therein in communication with both said casings, the inner end of said bottom being flared downwardly to seat against said shell, the outer end of said bottom being seated on said rim portion, an annular pleated paper filter element seated on said platform, air outlet means in communication with said upper casing for clean air, and means for removably attaching said upper casing to a said lower casing.

2. The air cleaner assembly of claim 1 wherein the air outlet means is disposed centrally of said upper and lower casings and a circular discharge opening is disposed in the bottom of said lower casing in communication with the outlet means.

3. The air cleaner assembly of claim 1 wherein the air outlet means is disposed centrally of the upper casing, and a circular discharge opening is provided in the top of said casing in communication with the outlet means.

4. An air cleaner assembly comprising a lower cylindrical casing having a circular opening in the top thereof and a liquid sump therein, a baffle seated in said liquid sump, an annular filter shell extending into said opening containing a filter medium, said shell being seated on the outer portion of said baffle and secured to the inner portion thereof to form a single unit therewith removable from said casing, said shell having an outer rim portion therearound, an annular air inlet passage provided between said casing and shell, an upper casing comprising upper and lower cylindrical portions, the bottom of said lower cylindrical portion having an annular platform formed thereon and spaced openings therein in communication with both of said casings, the inner end of said bottom being flared downwardly to seat on said shell, the outer end of said bottom being seated on said rim portion, an annular pleated paper filter element seated on said platform, air outlet means in communication with said upper casing for clean air, and means for removably attaching said upper casing to said lower casing.

5. An air cleaner assembly comprising a lower filter casing enclosing a liquid sump and a filter mass, an upper filter casing comprising upper and lower cylindrical portions enclosing a resin impregnated pleated paper filter element, a shell surrounding said filter mass, an annular air inlet passage provided between said lower cylindrical portion and shell, said lower cylindrical portion being seated on said shell, said lower cylindrical portion having an opening therein in communication with both said casings, air outlet means in communication with said upper casing for clean air, said upper cylindrical portion being detachably connected to said lower cylindrical portion for removal therefrom to service the filter element without disturbing said lower cylindrical portion and shell.

6. An air cleaner assembly comprising a lower cylindrical casing having a circular opening in the top thereof and a liquid sump therein, an annular filter shell extending through said circular opening and seated in said casing containing a filter medium therein, an annular air inlet passage provided between said casing and shell, an upper cylindrical casing comprising upper and lower cylindrical portions, the bottom of said lower cylindrical portion having an annular platform and spaced openings in communication with both said casings, said cylindrical portion being seated on said shell, an annular pleated paper filter element seated on said platform, air outlet means in communication with said upper casing for clean air, said upper cylindrical portion being detachably connected to said lower cylindrical portion for removing said upper cylindrical casing therefrom to service the filter element without disturbing said lower cylindrical portion and said lower casing.

References Cited in the file of this patent

UNITED STATES PATENTS

| | | |
|---|---|---|
| 2,239,731 | Neumann | Apr. 29, 1941 |
| 2,732,031 | Rabbit et al. | Jan. 24, 1956 |

FOREIGN PATENTS

| | | |
|---|---|---|
| 497,395 | Great Britain | Dec. 16, 1938 |
| 535,422 | Great Britain | Apr. 9, 1941 |
| 131,110 | Australia | Jan. 24, 1949 |